United States Patent [19]
Kleinhans

[11] 3,937,103
[45] Feb. 10, 1976

[54] FLYWHEEL ARRANGEMENT FOR AN ELECTRICAL MACHINE

[75] Inventor: Siegfried Kleinhans, Berlin, Germany

[73] Assignee: Siemens Aktiengesellschaft, Munich, Germany

[22] Filed: Jan. 28, 1974

[21] Appl. No.: 437,226

[30] Foreign Application Priority Data
Feb. 9, 1973  Germany............................ 2306915

[52] U.S. Cl. ....................... 74/572; 310/74; 403/15
[51] Int. Cl. ............................................ F16c 15/00
[58] Field of Search ............ 74/572; 403/15, 28, 29, 403/35, 36, 37, 273; 310/74

[56] References Cited
UNITED STATES PATENTS

| | | | |
|---|---|---|---|
| 2,764,437 | 9/1956 | Bratt | 403/15 |
| 3,531,146 | 9/1970 | Blad et al. | 403/15 |
| 3,698,750 | 10/1972 | Eastcott et al. | 403/15 |
| 3,716,732 | 2/1973 | Tillma | 310/74 |

*Primary Examiner*—Samuel Scott
*Assistant Examiner*—F. D. Shoemaker
*Attorney, Agent, or Firm*—Kenyon & Kenyon Reilly Carr & Chapin

[57] ABSTRACT

A flywheel arrangement for an electrical machine having a shaft includes a flywheel and a flange-like structure on the shaft for defining a seating surface to accommodate the flywheel. Passages are formed in the structure for directing oil under pressure to the seating surface.

12 Claims, 1 Drawing Figure

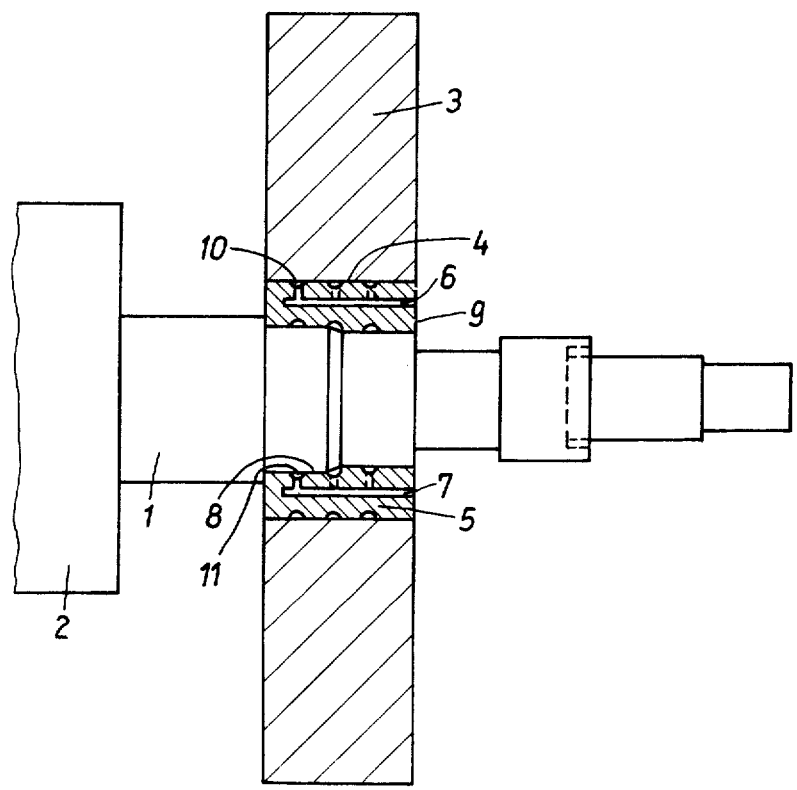

FLYWHEEL ARRANGEMENT FOR AN ELECTRICAL MACHINE

BACKGROUND OF THE INVENTION

Electric machines such as three-phase motors are commonly used to drive the coolant pumps in the primary loop of nuclear power plants. So that the coolant circulation can be maintained for a certain time in the event of a power failure, a flywheel is provided on the shaft on the electric machines driving the coolant pumps. These flywheels have heretofore been welded and were attached on the shaft by utilizing oil under pressure. For this purpose the wheels are provided with oil feed bores which first extend in the axial direction and are then brought in the radial direction to the seating surface of the flywheel.

Because a very high operational safety is demanded, especially for nuclear power plants, these flywheels, too, are subject to regulations which have recently been tightened substantially with respect to their manufacture and testing. The principal requirements are now: first, the flywheels must not be welded but instead must be forged as one piece; second, the maximum stress of the flywheels must not exceed ⅓ of the yield point; and third, the wheels must permit 100 percent ultrasonic testing also for later checking.

The construction of the flywheels known heretofore and their attachment on the shaft do not meet these new requirements.

SUMMARY OF THE INVENTION

Accordingly, it is an object of the invention to provide a flywheel arrangement which will comply with the abovementioned requirements. It is another object of the invention, to provide such a flywheel arrangement which fulfills these requirements and yet retains the forced-fit connection to the shaft established with assistance of oil under pressure.

The above objects are achieved with the flywheel arrangement of the invention which is suitable for an electrical machine having a shaft. The flywheel arrangement include a flywheel and a flange-like structure on the shaft for defining a seating surface to accommodate the flywheel. Passage means are formed in the structure for directing oil uner pressure to the seating surface. The flywheel can be attached to the shaft by utilizing oil under pressure.

The seating surface of the shaft for the flywheel is thus configured in flange-fashion. The passage means can be in the form of oil feed bores which extend first in the axial direction and are then brought in radial direction to the seating surface for the flywheel. The oil feed bores leading to the seating surface start out from an end-face of the flange-like structure.

The flywheel can therefore be constructed as a solid ring which contains no bores of any kind and which can therefore be tested any time 100 percent with ultrasound. Although all oil feed bores are located in the shaft, independence of the length of the shaft from a manufacturing point of view is achieved and the axially extending length of the oil feed bores corresponds only to the length of the seating surface of the flywheel. Because the oil feed bores and annular grooves thus lie on a diameter larger than the shaft diameter proper, they cause no undue stress increases.

To achieve independence of the dimensions of the flange containing the oil feed bores with respect to the dimensions of the other parts arranged on the shaft, it is advantageous to make the flange separate from the shaft. This separate part nevertheless stays with the shaft. It is advisable to mount the flange on the shaft also by using oil under pressure. Therefore, the flange body also contains oil feed bores which start from the same end-face and lead to the seating surface of the flange body on the shaft.

Although the invention is illustrated and described herein as a flywheel arrangement for an electrical machine, it is nevertheless not intended to be limited to the details shown, since various modifications may be made therein within the scope and the range of the claims. The invention, however, together with additional objects and advantages will be best understood from the following description and in connection with the accompanying drawing.

BRIEF DESCRIPTION OF THE DRAWING

The drawing is a schematic diagram, partially in section, of the flywheel arrangement according to the invention.

DESCRIPTION OF THE PREFERRED EMBODIMENTS OF THE INVENTION

The solid, forged flywheel 3 is arranged on the shaft 1 of the rotor 2 of an electric machine such as a four-pole three-phase motor for example. The flywheel 3 is constructed as a geometrically simple, solid ring body. Because the flywheel is subject to stringent inspection requirements, it can be tested in this form 100 percent with ultrasound and the results are unambiguously comparable. The seating surface 4 of the shaft 1 for the flywheel 3 is configured as a flange 5 which is separate from the shaft 1. The flange 5 contains passage means in the form of oil feed bores which lead to the seating surface 4 for the solid flywheel 3. The flange 5 also contains ancillary passage means comprising oil feed bores 7 which lead to the seating surface 8 of the flange 5 on the shaft 1. All the oil feed bores 6 and 7 are arranged in distributed fashion along the circumference of the flange 5 and start from an end-face 9 of the flange 5. The bores 6 and 7 initially extend in the axial direction and then in the radial direction to the respective seating surfaces 4 and 8 whereat they open into small annular grooves 10 and 11 for the distributing the oil over the respective seating surfaces.

Because all the oil feed bores 6 and 7 lie only within the flange 5, which has the form of a sleeve, stress increases caused by the notch effect of the bores and circular grooves are avoided in the flywheel 3 as well as in the shaft 1.

For the assembly, the flange 5 is first placed on the shaft 1, for which purpose the oil under pressure is used. Then the solid flywheel 3 is warmed up and pulled over the flange 5 and the desired press fit is established in the normal manner by shrinkage. The stress peaks which may occur here in an uncontrolled manner, particularly through axial shrinkage, are equalized by a one-time expansion with oil under pressure introduced through the oil feed bores 6. If the solid flywheel 3 must be removed, the oil under pressure alone is used for this purpose.

What is claimed is:

1. A flywheel arrangement for an electrical machine having a shaft comprising: an annular solid flywheel devoid of any cavities therein; a flange-like structure on the shaft for defining a seating surface to accommodate said flywheel; said flywheel tightly engaging said seating surface thereby causing undesired stress peaks to develop in said flywheel; and, passage means formed in said structure for directing oil under pressure directly to said seating surface for expanding said flywheel to remove said stress peaks and, if required, for facilitating the subsequent removal of said flywheel from said seating surface.

2. The flywheel arrangement of claim 1, said flange-like structure being a separate body mounted on the shaft.

3. The flywheel arrangement of claim 2 comprising ancillary passage means formed in said structure for directing oil under pressure to the interface between said structure and the shaft, said ancillary passage means being separate and independent of said first-mentioned passage means.

4. The flywheel arrangement of claim 3, said flywheel being a solid member.

5. The flywheel arrangement of claim 1, said flange-like structure extending in a flange-like manner from the surface of the shaft and having an end-face disposed in a plane transverse to the longitudinal axis of the shaft; said passage means comprising a plurality of bores first extending from said end-face in a direction parallel to the shaft and then continuing in a radial direction to said seating surface.

6. The flywheel arrangement of claim 5, said flywheel being a solid member.

7. The flywheel arrangement of claim 5, said passage means including a plurality of annular grooves formed in said seating surface and communicating with said bores.

8. The flywheel arrangement of claim 7, said flange-like structure being a separate body mounted on the shaft.

9. The flywheel arrangement on claim 8 comprising ancillary passage means formed in said structure for directing oil under pressure to the interface between said structure and the shaft.

10. The flywheel arrangement of claim 9, said ancillary passage means including a plurality of bores extending from said end-face and extending through said structure to said interface.

11. The flywheel arrangement of claim 10, said ancillary passage means comprising a plurality of annular grooves communicating with said last-mentioned bores and formed in the surface of said structure at said interface.

12. The flywheel arrangement of claim 11, said flywheel being a solid member.

* * * * *